United States Patent
Yoshida

(10) Patent No.: US 8,467,619 B2
(45) Date of Patent: Jun. 18, 2013

(54) IMAGE COMPRESSING APPARATUS, IMAGE COMPRESSING METHOD, IMAGE DECOMPRESSING APPARATUS, AND STORAGE MEDIUM

(75) Inventor: Shigeru Yoshida, Gamagori (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 12/563,405

(22) Filed: Sep. 21, 2009

(65) Prior Publication Data

US 2010/0074545 A1    Mar. 25, 2010

Related U.S. Application Data

(63) Continuation of application No. PCT/JP2007/000336, filed on Mar. 29, 2007.

(51) Int. Cl.
G06K 9/36 (2006.01)
G06T 9/00 (2006.01)

(52) U.S. Cl.
USPC .......................... 382/233; 382/240; 382/248

(58) Field of Classification Search
USPC ............. 382/232, 233, 248, 240; 375/240.18; 348/403.1
See application file for complete search history.

(56) References Cited

U.S. PATENT DOCUMENTS

| 2003/0185439 A1* | 10/2003 | Malvar ........................... 382/166 |
| 2005/0036701 A1* | 2/2005 | Miyazawa et al. ............ 382/240 |

FOREIGN PATENT DOCUMENTS

| EP | 1 662 801 A1 | 5/2006 |
| JP | 6-178118 | 6/1994 |
| JP | 6-195369 | 7/1994 |
| JP | 6-204888 | 7/1994 |
| JP | 6-205392 | 7/1994 |
| JP | 63-163675 | 7/1998 |
| JP | 2006-54846 | 2/2006 |
| JP | 2006-332836 | 12/2006 |
| WO | 2006/006564 A1 | 1/2006 |

OTHER PUBLICATIONS

Notice of Rejection Ground for Japanese Application No. 2009-507274; mailed May 17, 2011.
Z-X Hou et al.; "Fast Slant Transform with Sequency Increment and Its Application in Image Compression"; Proc. of the Third International Conference on Machine Learning and Cybernetics, Aug. 2004; pp. 4085-4089.
W.K. Pratt et al.; "Slant Transform Image Coding"; IEEE Trans. on Communications, vol. COM-22, No. 8; Aug. 1974; pp. 1075-1093.
H. Kiya; "Subband Encoding and Wavelet Transform (Combination of Compression Technique, e.g., DCT, and Signal Processing)"; Interface; Aug. 1992; pp. 147-169.

* cited by examiner

*Primary Examiner* — Jon Chang
(74) *Attorney, Agent, or Firm* — Staas & Halsey LLP

(57) ABSTRACT

In the present invention, a first pixel data group of several pixels existing in block into which an image is divided is divided, thereby generating several second pixel data groups. In the second pixel data group, an orthogonal transformation is performed in several layers using only the predetermined number of coefficients from the lowest frequency side from among the coefficients obtained by the orthogonal transformation. The predetermined number of coefficients from the lowest frequency side from among the coefficients obtained by the orthogonal transformation in the highest layer, and the coefficients that are obtained in a layer other than the highest layer not used for the orthogonal transformation are encoded, thereby generation the compressed data. Accordingly, encoding is performed while separating lower frequency components from higher frequency components.

10 Claims, 17 Drawing Sheets

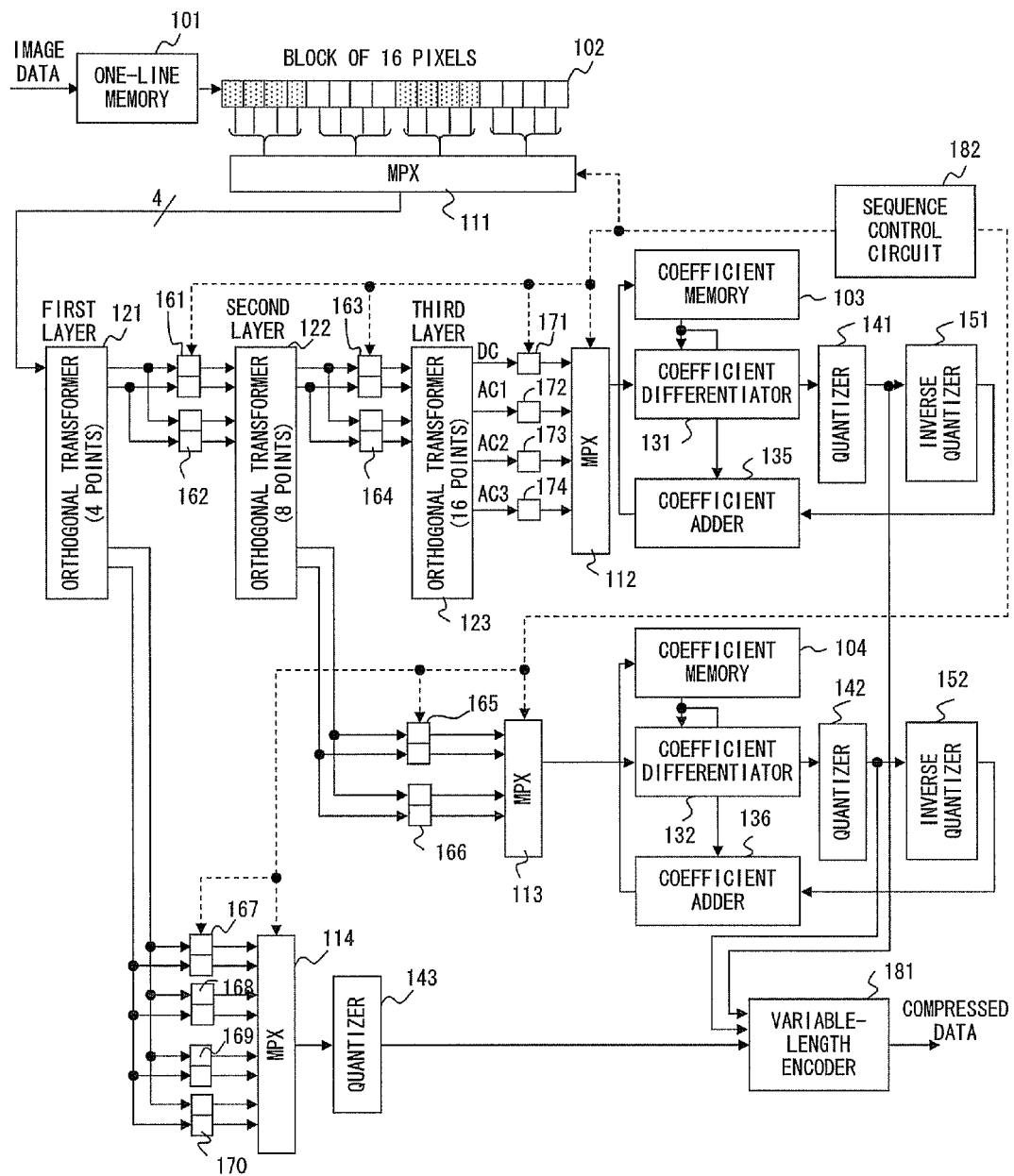
F I G. 1

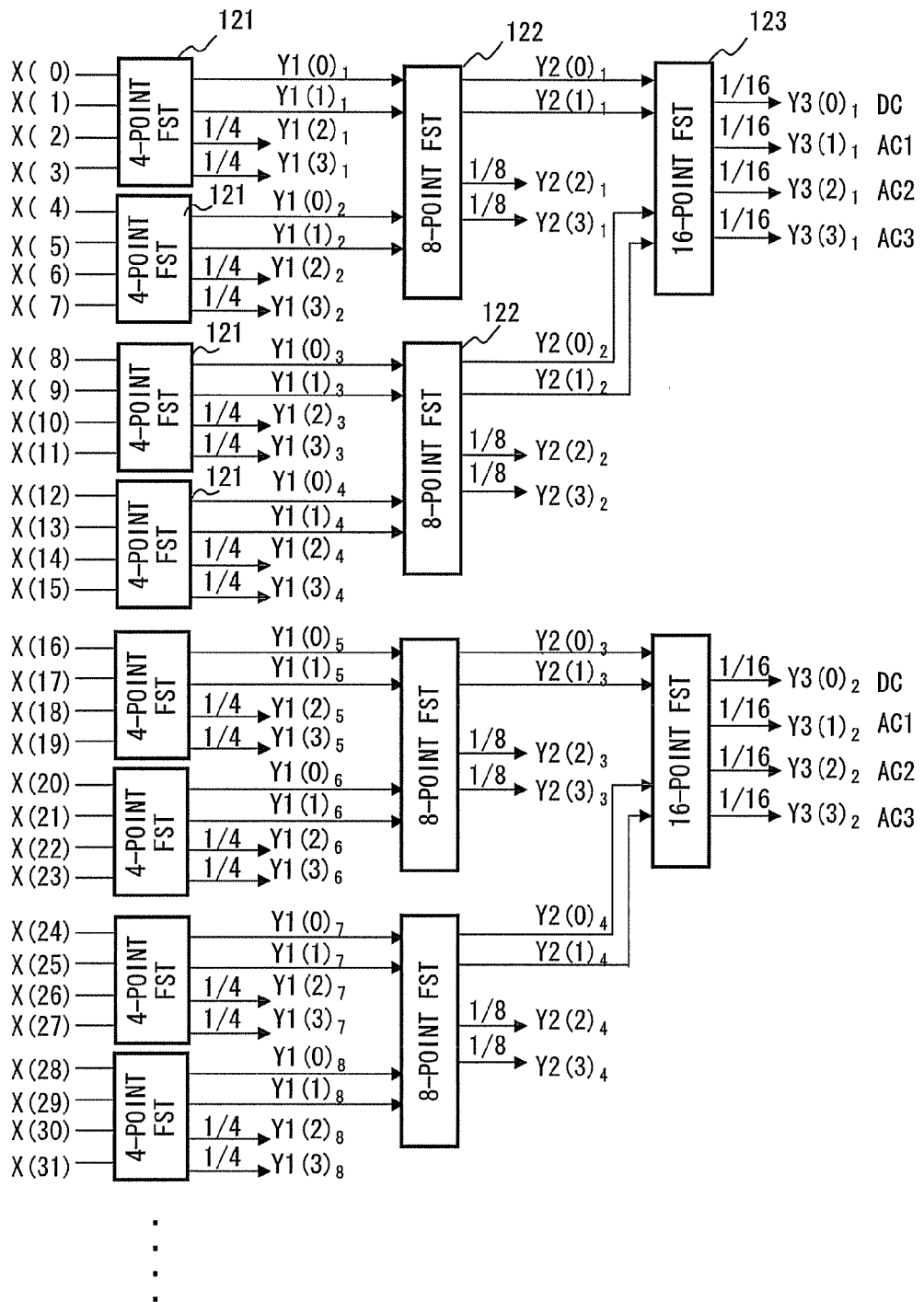
F I G. 2

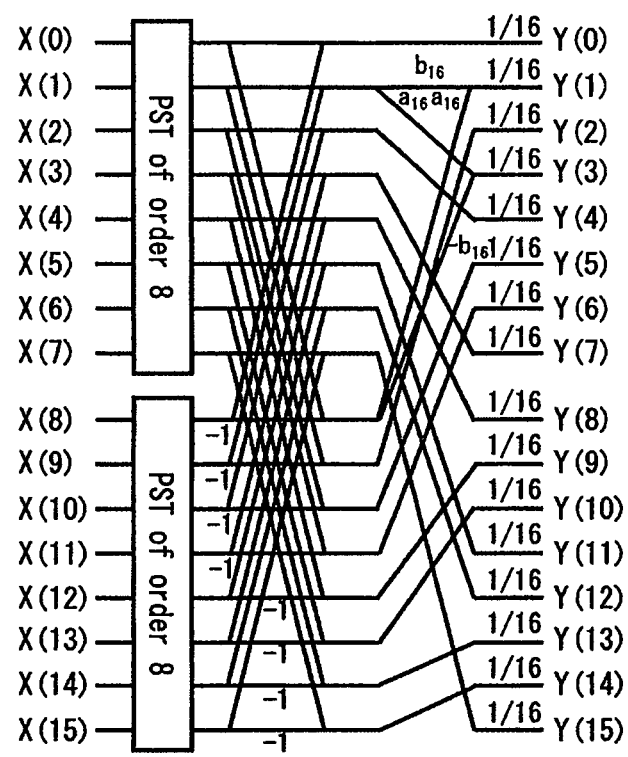
F I G. 4 C

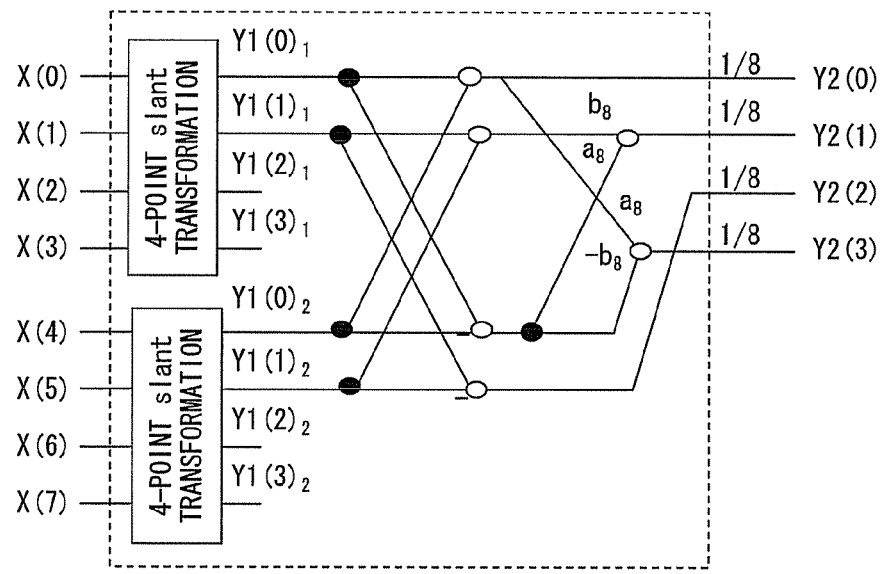
F I G. 5

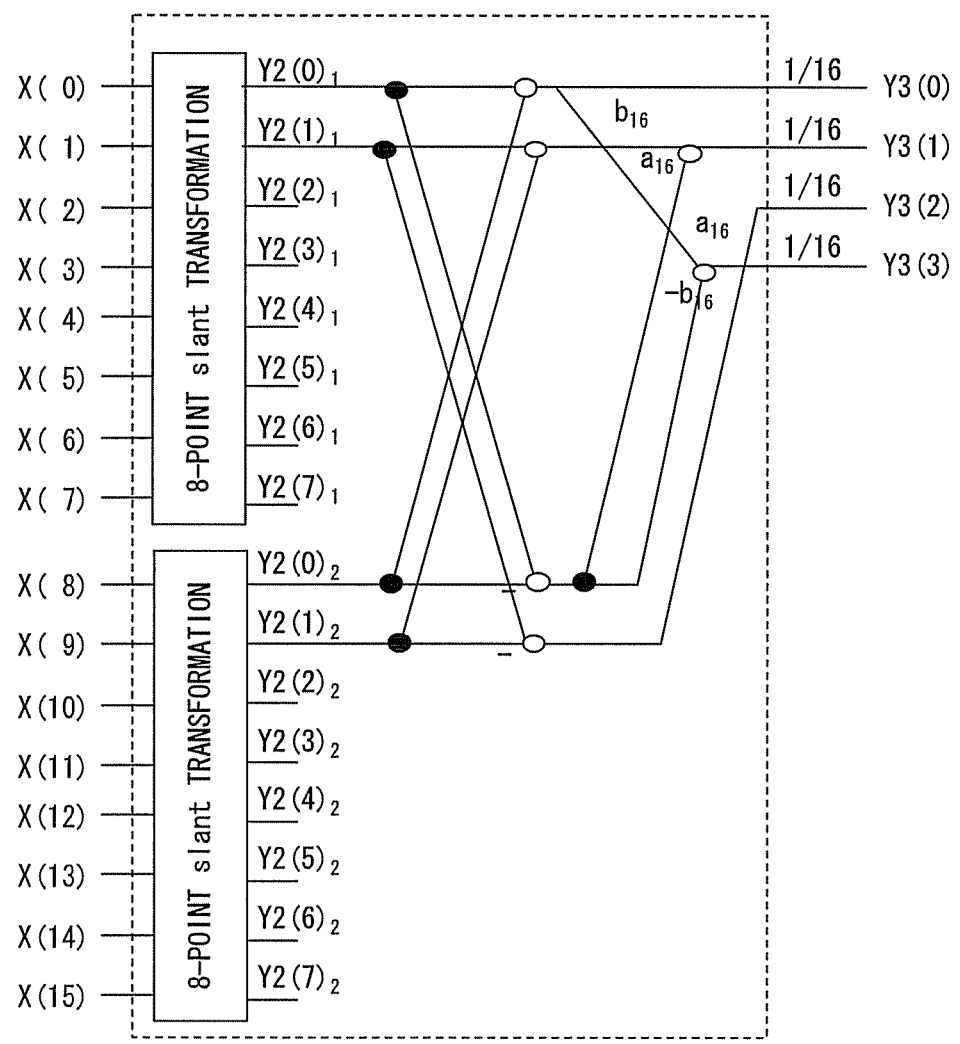
F I G. 6

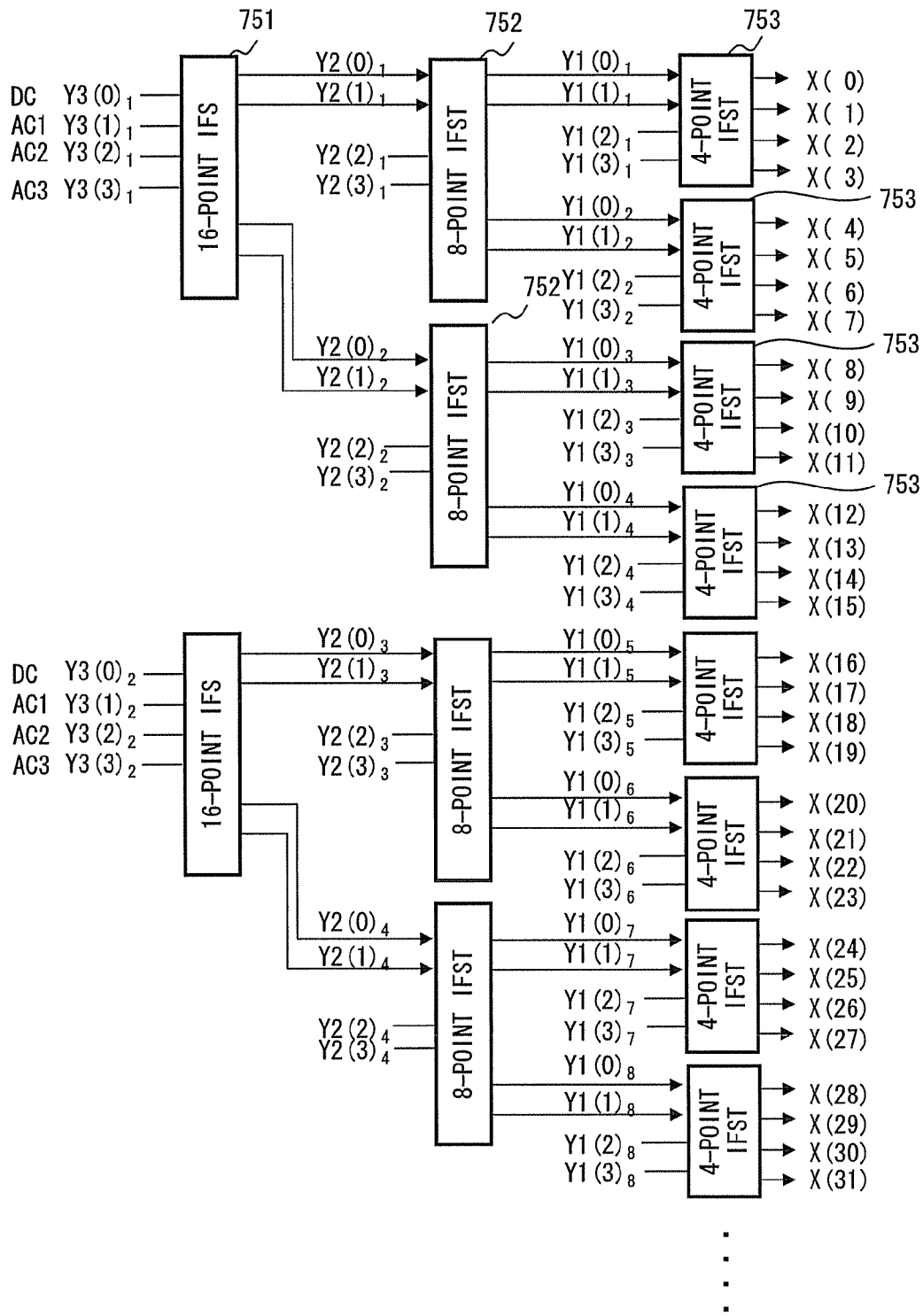
F I G. 8

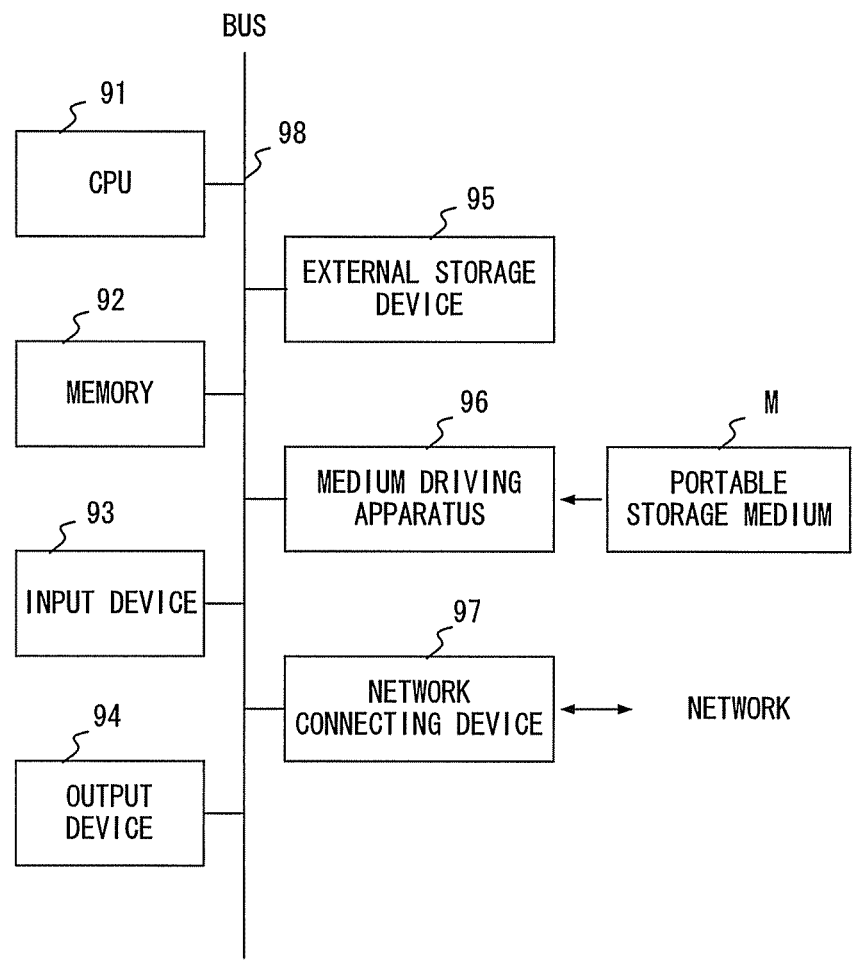
F I G. 9

NOTATIONS OF EACH PIXEL IN SPATIAL DOMAIN

| X(0, 0) | X(1, 0) | X(2, 0) | X(3, 0) | X(4, 0) | X(5, 0) | X(6, 0) | X(7, 0) |
|---------|---------|---------|---------|---------|---------|---------|---------|
| X(0, 1) | X(1, 1) | X(2, 1) | X(3, 1) | X(4, 1) | X(5, 1) | X(6, 1) | X(7, 1) |
| X(0, 2) | X(1, 2) | X(2, 2) | X(3, 2) | X(4, 2) | X(5, 2) | X(6, 2) | X(7, 2) |
| X(0, 3) | X(1, 3) | X(2, 3) | X(3, 3) | X(4, 3) | X(5, 3) | X(6, 3) | X(7, 3) |
| X(0, 4) | X(1, 4) | X(2, 4) | X(3, 4) | X(4, 4) | X(5, 4) | X(6, 4) | X(7, 4) |
| X(0, 5) | X(1, 5) | X(2, 5) | X(3, 5) | X(4, 5) | X(5, 5) | X(6, 5) | X(7, 5) |
| X(0, 6) | X(1, 6) | X(2, 6) | X(3, 6) | X(4, 6) | X(5, 6) | X(6, 6) | X(7, 6) |
| X(0, 7) | X(1, 7) | X(2, 7) | X(3, 7) | X(4, 7) | X(5, 7) | X(6, 7) | X(7, 7) |

F I G. 1 0 A

| $Y1(0)_1^1$ | $Y1(1)_1^1$ | $Y1(2)_1^1$ | $Y1(3)_1^1$ | $Y1(0)_2^1$ | $Y1(1)_2^1$ | $Y1(2)_2^1$ | $Y1(3)_2^1$ |
|---|---|---|---|---|---|---|---|
| $Y1(0)_1^2$ | $Y1(1)_1^2$ | $Y1(2)_1^2$ | $Y1(3)_1^2$ | $Y1(0)_2^2$ | $Y1(1)_2^2$ | $Y1(2)_2^2$ | $Y1(3)_2^2$ |
| $Y1(0)_1^3$ | $Y1(1)_1^3$ | $Y1(2)_1^3$ | $Y1(3)_1^3$ | $Y1(0)_2^3$ | $Y1(1)_2^3$ | $Y1(2)_2^3$ | $Y1(3)_2^3$ |
| $Y1(0)_1^4$ | $Y1(1)_1^4$ | $Y1(2)_1^4$ | $Y1(3)_1^4$ | $Y1(0)_2^4$ | $Y1(1)_2^4$ | $Y1(2)_2^4$ | $Y1(3)_2^4$ |
| $Y1(0)_1^5$ | $Y1(1)_1^5$ | $Y1(2)_1^5$ | $Y1(3)_1^5$ | $Y1(0)_2^5$ | $Y1(1)_2^5$ | $Y1(2)_2^5$ | $Y1(3)_2^5$ |
| $Y1(0)_1^6$ | $Y1(1)_1^6$ | $Y1(2)_1^6$ | $Y1(3)_1^6$ | $Y1(0)_2^6$ | $Y1(1)_2^6$ | $Y1(2)_2^6$ | $Y1(3)_2^6$ |
| $Y1(0)_1^7$ | $Y1(1)_1^7$ | $Y1(2)_1^7$ | $Y1(3)_1^7$ | $Y1(0)_2^7$ | $Y1(1)_2^7$ | $Y1(2)_2^7$ | $Y1(3)_2^7$ |
| $Y1(0)_1^8$ | $Y1(1)_1^8$ | $Y1(2)_1^8$ | $Y1(3)_1^8$ | $Y1(0)_2^8$ | $Y1(1)_2^8$ | $Y1(2)_2^8$ | $Y1(3)_2^8$ |

FIG. 10B

| Y1(0, 0)$_1$ | Y1(1, 0)$_1$ | Y1(2, 0)$_1$ | Y1(3, 0)$_1$ | Y1(0, 0)$_2$ | Y1(1, 0)$_2$ | Y1(2, 0)$_2$ | Y1(3, 0)$_2$ |
|---|---|---|---|---|---|---|---|
| Y1(0, 1)$_1$ | Y1(1, 1)$_1$ | Y1(2, 1)$_1$ | Y1(3, 1)$_1$ | Y1(0, 1)$_2$ | Y1(1, 1)$_2$ | Y1(2, 1)$_2$ | Y1(3, 1)$_2$ |
| Y1(0, 2)$_1$ | Y1(1, 2)$_1$ | Y1(2, 2)$_1$ | Y1(3, 2)$_1$ | Y1(0, 2)$_2$ | Y1(1, 2)$_2$ | Y1(2, 2)$_2$ | Y1(3, 2)$_2$ |
| Y1(0, 3)$_1$ | Y1(1, 3)$_1$ | Y1(2, 3)$_1$ | Y1(3, 3)$_1$ | Y1(0, 3)$_2$ | Y1(1, 3)$_2$ | Y1(2, 3)$_2$ | Y1(3, 3)$_2$ |
| Y1(0, 0)$_3$ | Y1(1, 0)$_3$ | Y1(2, 0)$_3$ | Y1(3, 0)$_3$ | Y1(0, 0)$_4$ | Y1(1, 0)$_4$ | Y1(2, 0)$_4$ | Y1(3, 0)$_4$ |
| Y1(0, 1)$_3$ | Y1(1, 1)$_3$ | Y1(2, 1)$_3$ | Y1(3, 1)$_3$ | Y1(0, 1)$_4$ | Y1(1, 1)$_4$ | Y1(2, 1)$_4$ | Y1(3, 1)$_4$ |
| Y1(0, 2)$_3$ | Y1(1, 2)$_3$ | Y1(2, 2)$_3$ | Y1(3, 2)$_3$ | Y1(0, 2)$_4$ | Y1(1, 2)$_4$ | Y1(2, 2)$_4$ | Y1(3, 2)$_4$ |
| Y1(0, 3)$_3$ | Y1(1, 3)$_3$ | Y1(2, 3)$_3$ | Y1(3, 3)$_3$ | Y1(0, 3)$_4$ | Y1(1, 3)$_4$ | Y1(2, 3)$_4$ | Y1(3, 3)$_4$ |

FIG. 10C

| Y1(0, 0)$_1$ | Y1(1, 0)$_1$ | Y1(0, 0)$_2$ | Y1(1, 0)$_2$ | Y1(2, 0)$_1$ | Y1(3, 0)$_1$ | Y1(3, 0)$_2$ | Y1(3, 0)$_2$ |
|---|---|---|---|---|---|---|---|
| Y1(0, 1)$_1$ | Y1(1, 1)$_1$ | Y1(0, 1)$_2$ | Y1(1, 1)$_2$ | Y1(2, 1)$_1$ | Y1(3, 1)$_1$ | Y1(3, 1)$_2$ | Y1(3, 1)$_2$ |
| Y1(0, 0)$_3$ | Y1(1, 0)$_3$ | Y1(0, 0)$_4$ | Y1(1, 0)$_4$ | Y1(2, 0)$_3$ | Y1(3, 0)$_3$ | Y1(2, 0)$_4$ | Y1(3, 0)$_4$ |
| Y1(0, 1)$_3$ | Y1(0, 1)$_3$ | Y1(0, 1)$_4$ | Y1(1, 1)$_4$ | Y1(2, 1)$_3$ | Y1(3, 1)$_3$ | Y1(2, 1)$_4$ | Y1(3, 1)$_4$ |
| Y1(0, 2)$_1$ | Y1(1, 2)$_1$ | Y1(0, 2)$_2$ | Y1(1, 2)$_2$ | Y1(2, 2)$_1$ | Y1(3, 2)$_1$ | Y1(2, 2)$_2$ | Y1(3, 2)$_2$ |
| Y1(0, 3)$_1$ | Y1(1, 3)$_1$ | Y1(0, 3)$_2$ | Y1(1, 3)$_2$ | Y1(2, 3)$_1$ | Y1(3, 3)$_1$ | Y1(2, 3)$_2$ | Y1(3, 3)$_2$ |
| Y1(0, 2)$_3$ | Y1(1, 2)$_3$ | Y1(0, 2)$_4$ | Y1(1, 2)$_4$ | Y1(2, 2)$_3$ | Y1(3, 2)$_3$ | Y1(2, 2)$_4$ | Y1(3, 2)$_4$ |
| Y1(0, 3)$_3$ | Y1(1, 3)$_3$ | Y1(0, 3)$_4$ | Y1(1, 3)$_4$ | Y1(2, 3)$_3$ | Y1(3, 3)$_3$ | Y1(2, 3)$_4$ | Y1(3, 3)$_4$ |

FIG. 10D

| | | | | | | | |
|---|---|---|---|---|---|---|---|
| Y2(0, 0)$_1$ | Y2(1, 0)$_1$ | Y2(2, 0)$_1$ | Y2(3, 0)$_1$ | Y1(2, 0)$_1$ | Y1(3, 0)$_1$ | Y1(3, 0)$_2$ | Y1(3, 0)$_2$ |
| Y2(0, 1)$_1$ | Y2(1, 1)$_1$ | Y2(2, 1)$_1$ | Y2(3, 1)$_1$ | Y1(2, 1)$_1$ | Y1(3, 1)$_1$ | Y1(3, 1)$_2$ | Y1(3, 1)$_2$ |
| Y2(0, 2)$_1$ | Y2(1, 2)$_1$ | Y2(2, 2)$_1$ | Y2(3, 2)$_1$ | Y1(2, 0)$_3$ | Y1(3, 0)$_3$ | Y1(2, 0)$_4$ | Y1(3, 0)$_4$ |
| Y2(0, 3)$_1$ | Y2(1, 3)$_1$ | Y2(2, 3)$_1$ | Y2(3, 3)$_1$ | Y1(2, 1)$_3$ | Y1(3, 1)$_3$ | Y1(2, 1)$_4$ | Y1(3, 1)$_4$ |
| Y1(0, 2)$_1$ | Y1(1, 2)$_1$ | Y1(0, 2)$_2$ | Y1(1, 2)$_2$ | Y1(2, 2)$_1$ | Y1(3, 2)$_1$ | Y1(2, 2)$_2$ | Y1(3, 2)$_2$ |
| Y1(0, 3)$_1$ | Y1(1, 3)$_1$ | Y1(0, 3)$_2$ | Y1(1, 3)$_2$ | Y1(2, 3)$_1$ | Y1(3, 3)$_1$ | Y1(2, 3)$_2$ | Y1(3, 3)$_2$ |
| Y1(0, 2)$_3$ | Y1(1, 2)$_3$ | Y1(0, 2)$_3$ | Y1(1, 2)$_3$ | Y1(2, 2)$_3$ | Y1(3, 2)$_3$ | Y1(2, 2)$_4$ | Y1(3, 2)$_4$ |
| Y1(0, 3)$_3$ | Y1(1, 3)$_3$ | Y1(0, 3)$_3$ | Y1(1, 3)$_3$ | Y1(2, 3)$_3$ | Y1(3, 3)$_3$ | Y1(2, 3)$_4$ | Y1(3, 3)$_4$ |

FIG. 10E

| $Y2(0)_1^1$ | $Y2(1)_1^1$ | $Y2(2)_1^1$ | $Y2(3)_1^1$ | $Y1(2)_1^1$ | $Y1(3)_1^1$ | $Y1(2)_2^1$ | $Y1(3)_2^1$ |
|---|---|---|---|---|---|---|---|
| $Y2(0)_1^2$ | $Y2(1)_1^2$ | $Y2(2)_1^2$ | $Y2(3)_1^2$ | $Y1(2)_1^2$ | $Y1(3)_1^2$ | $Y1(2)_2^2$ | $Y1(3)_2^2$ |
| $Y2(0)_1^3$ | $Y2(1)_1^3$ | $Y2(2)_1^3$ | $Y2(3)_1^3$ | $Y1(2)_1^3$ | $Y1(3)_1^3$ | $Y1(2)_2^3$ | $Y1(3)_2^3$ |
| $Y2(0)_1^4$ | $Y2(1)_1^4$ | $Y2(2)_1^4$ | $Y2(3)_1^4$ | $Y1(2)_1^4$ | $Y1(3)_1^4$ | $Y1(2)_2^4$ | $Y1(3)_2^4$ |
| $Y2(0)_1^5$ | $Y2(1)_1^5$ | $Y2(2)_1^5$ | $Y2(3)_1^5$ | $Y1(2)_1^5$ | $Y1(3)_1^5$ | $Y1(2)_2^5$ | $Y1(3)_2^5$ |
| $Y2(0)_1^6$ | $Y2(1)_1^6$ | $Y2(2)_1^6$ | $Y2(3)_1^6$ | $Y1(2)_1^6$ | $Y1(3)_1^6$ | $Y1(2)_2^6$ | $Y1(3)_2^6$ |
| $Y2(0)_1^7$ | $Y2(1)_1^7$ | $Y2(2)_1^7$ | $Y2(3)_1^7$ | $Y1(2)_1^7$ | $Y1(3)_1^7$ | $Y1(2)_2^7$ | $Y1(3)_2^7$ |
| $Y2(0)_1^8$ | $Y2(1)_1^8$ | $Y2(2)_1^8$ | $Y2(3)_1^8$ | $Y1(2)_1^8$ | $Y1(3)_1^8$ | $Y1(2)_2^8$ | $Y1(3)_2^8$ |

FIG. 11

IMAGE COMPRESSING APPARATUS, IMAGE COMPRESSING METHOD, IMAGE DECOMPRESSING APPARATUS, AND STORAGE MEDIUM

CROSS-REFERENCE TO RELATED APPLICATION

This application is a continuation application of International Application No. PCT/JP2007/000336 filed on Mar. 29, 2007 and designated the U.S., the entire contents of which are incorporated herein by reference.

FIELD

The present invention relates to a technique for compressing image data by using an orthogonal transformation that transforms the data of time domain to the data of frequency domain.

BACKGROUND

There are already several types of image compression techniques. There is one technique using orthogonal transformation that transforms time domain data to frequency domain data. The image compression technique with that orthogonal transformation realizes a relatively high compressibility ratio.

Numerous calculations are required for the above-mentioned orthogonal transformation. Accordingly, the scale of hardware needed to realize an image compression apparatus performing image compression by means of the orthogonal transformation becomes large. The techniques of image compression are expected to be applied to broader fields in the future. Also, in this respect, it is considered to be important that the image compressing apparatus be realized with hardware on a smaller scale while maintaining the high compressibility ratio. The same applies to an image decompressing apparatus that decompresses the compressed image.

Recently, in cars for example, there has been an increasing need to use video in multiple channels, as in the cases of installing several monitoring cameras and monitoring their video from the driver's seat, or utilizing the DVD or video of a car navigation system from the rear seat. In order to avoid complicated wiring due to the increased number of channels, the idea of installing a LAN in the car has been introduced so as to perform data transmission of the multiple channels by means of this LAN (vehicle-mounted LAN).

The requirements for the vehicle-mounted LAN are (1) being light weight (low cost), (2) having high image quality in both natural images and CG (Computer Graphics), and (3) having low delay. (3) Having low delay is required for transmitting the image of a vehicle-mounted camera for the security use. As the amount of data is large in a video (image), data compression must be performed with a reasonably high compressibility ratio in order to realize the low delay. Therefore, it is considered that image compression technology will be an essential technology for vehicle-mounted LANs in the future.

[Patent Document 1]

Japanese Laid-open Patent Publication No. 2006-054846

[Non-patent Document 1]

Z-X Hou, H Chen, X-L Li, "Fast Slant Transform with Sequency Increment and Its Application in Image Compression", Proc. of 3rd International Conference on Machine Learning and Cybernetics, Sjamhjai, 26-29, August 2004

[Non-patent Document 2]

W. K. Pratt, W-H. Chen, L. R. Welch, "Slant Transform Image Coding", IEEE Trans. on Communications, Vol. COM-22, No. 8, pp. 1075-1093, August 1974

[Non-patent Document 3]

H Kiya, "Subband Encoding and Wavelet Transform (Combination of Compression Technique, e.g., DCT, and Signal Processing)", Interface, pp. 147-169 (August 1992)

SUMMARY

The image compressing apparatus according to the present invention is for compressing image data that has pixel data for each pixel, and includes a data generation unit for generating a plurality of second pixel data groups by dividing a first pixel data group including a plurality of pixels existing in block that divides an image; a first transforming unit for performing an orthogonal transformation for each of the second pixel data groups generated by the data generation unit, and outputting a plurality of coefficients that represent frequency components; a second transforming unit for performing an orthogonal transformation using a predetermined number of coefficients from the lowest frequency side from among the plurality of coefficients obtained by the orthogonal transformation for each of the second pixel data performed by the first transforming unit; and an encoding unit for generating compressed data from coefficients outputted by the second transforming unit and coefficients not used by the second transforming unit for the orthogonal transformation from among coefficients output by the first transforming unit.

An image compressing method according to the present invention is for compressing image data that has pixel data for each pixel, and includes generating a plurality of second pixel data groups by dividing a first pixel data group including a plurality of pixels existing in block that divides an image, performing orthogonal transformations in a plurality of layers to the second pixel data group using only a predetermined number of coefficients from the lowest frequency side from among coefficients obtained by a plurality of orthogonal transformations performed in lower layer, and generating compressed data by encoding a predetermined number of coefficients from the lowest frequency side among coefficients obtained in the orthogonal transformation of the highest layer and coefficients not used in the orthogonal transformation among coefficients obtained in a layer other than the highest layer.

The image decompressing apparatus according to the present invention is for decompressing image data that is encoded by the image compressing apparatus according to claim 1, and includes a first decompressing unit for decompressing coefficients outputted by the second transforming unit and for decompressing coefficients output by the first transforming unit but not used by the second transforming unit for the orthogonal transformation, said coefficients being from the compressed data; a first inverse transforming unit for performing an inverse orthogonal transformation using coefficients outputted by the second transforming unit decompressed by the first decompressing unit; and a second inverse transforming unit for performing an inverse orthogonal transformation using a predetermined number of coefficients from the lowest frequency side from among coefficients outputted by the first inverse transforming unit, and coefficients of the first transforming unit decompressed by the first decompressing unit, and decompressing the second pixel data group.

In the present invention, a plurality of second pixel data groups is generated by dividing a first pixel data group including a plurality of pixels existing in blocks that divide an image, an orthogonal transformation is performed in a plurality of layers to the second pixel data group using only a predetermined number of coefficients from the lowest frequency side from among coefficients obtained by a plurality of orthogonal transformations performed in lower layer, and compressed data is generated by encoding a predetermined number of coefficients from the lowest frequency side from among coefficients obtained in the orthogonal transformation of the highest layer and coefficients not used in the orthogonal transformation from among coefficients obtained in a layer other than the highest layer.

The amount of calculation required in the entire orthogonal transformation can be reduced by selecting only a predetermined number of the coefficients that are obtained in the orthogonal transformation from the lowest frequency side and by using the selected coefficients in a subsequent stage of the layer. Accordingly, the orthogonal transformation of a larger block can be performed with a smaller amount of calculation. As a result, the scale of a circuit can be suppressed, and real-time usage can easily be realized.

The encoding is performed for the predetermined number of coefficients from the coefficients obtained by orthogonal transformation in the highest layer, and the coefficients that are obtained in the other layers not used for orthogonal transformation. Accordingly, an entire block is encoded for the low-frequency component, and a block which became small by the layered is encoded for the high-frequency component. As a basic function of different length is used depending on the frequency, high compressibility and high image quality can be achieved.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a block diagram illustrating a configuration of an image compressing apparatus according to an embodiment of the present invention.

FIG. 2 is a diagram illustrating an orthogonal transformation performed in layers according to the present embodiment.

FIG. 4C is a diagram illustrating a computation performed in a sixteen-point slant transformation by means of an eight-point slant transformation.

FIG. 5 is a diagram illustrating a computation that is actually performed in an eight-point slant transformation by means of a four-point slant transformation.

FIG. 6 is a diagram illustrating a computation that is actually performed in a sixteen-point slant transformation by means of an eight-point slant transformation.

FIG. 8 is a diagram illustrating an inverse orthogonal transformation performed in layers according to the present embodiment.

FIG. 9 is a diagram illustrating an exemplary image compressing apparatus or an exemplary hardware configuration of the computer enabling the image compressing apparatus.

FIG. 10A is a diagram illustrating the notations of each pixel in the spatial domain.

FIG. 10B is a diagram illustrating the coefficients obtained by performing an orthogonal transformation of a four-pixel block in a horizontal direction.

FIG. 10C is a diagram illustrating the coefficients obtained by performing an orthogonal transformation of a four-pixel block in the vertical direction subsequent to the orthogonal transformation of four-pixel block in the horizontal direction.

FIG. 10D is a diagram illustrating a state in which the order of coefficients is changed subsequent to an orthogonal transformation of four-pixel block in the vertical direction.

FIG. 10E is a diagram illustrating the coefficients obtained by performing an orthogonal transformation of an eight-pixel block in the respective horizontal and vertical directions subsequent to the change of order.

FIG. 11 is a diagram illustrating the coefficients obtained by performing an orthogonal transformation of a four-pixel block and an eight-pixel block in the horizontal direction.

DESCRIPTION OF EMBODIMENTS

Figure 3:
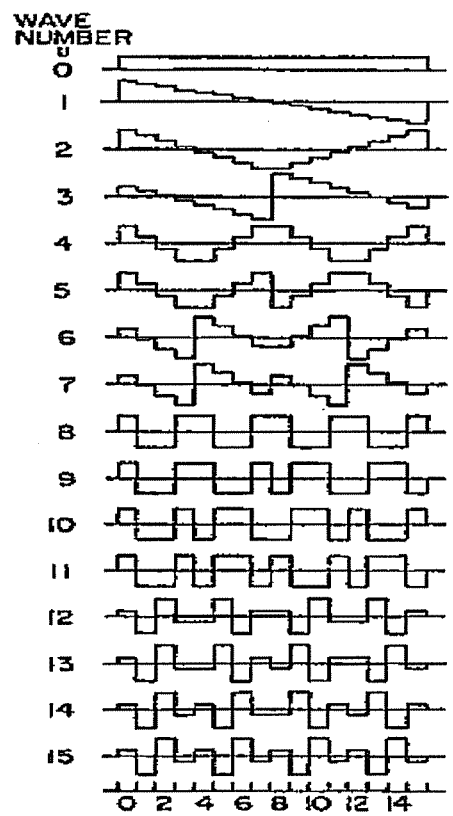
FIG. 3 is a diagram illustrating a basis function of a sixteen-point slant transformation.

Preferred embodiments of the present invention will now be described in detail with reference to the accompanying drawings.

FIG. 1 is a block diagram illustrating a configuration of an image compressing apparatus according to an embodiment of the present invention.

The image compressing apparatus assumes a vehicle-installed LAN in a car, and is configured to include a one-line memory 101, a register group 102 having sixteen registers, ten register groups 161-170 with each group having two registers, four registers 171-174, two coefficient memories 103 and 104, four multiplexers (MPX) 111-114, three orthogonal transformers 121-123, two coefficient differentiators 131 and 132, two coefficient adders 135 and 136, three quantizers 141-143, two inverse quantizers 151 and 152, a variable-length encoder 181, and a sequence control circuit 182, as illustrated in FIG. 1.

The operation in the above configuration is now described.

The one-line memory 101 is a memory capable of storing image data of one line. The pixel data of one block (i.e., pixel data of 16 pixels consecutive on a line) is read from the image data stored in the memory 101, and is stored in the register group 102. Accordingly, the compression of the image data is performed in a unit of block. The overall control, including the readout of pixel data to the register group 102, is performed by a sequence control circuit 182.

The sequence control circuit 182 stores pixel data of sixteen pixels in the register group 102, and selects pixel data of four pixels from the stored pixel data by using the multiplexer 111 to output the selected pixel data to the four-point orthogonal transformer 121. Accordingly, the orthogonal transformer 121 performs the orthogonal transformation of the pixel data of four pixels. The sequence control circuit 182 stores, in the register group 161, two coefficients obtained in the orthogonal transformation from the lowest frequency side. The remaining two coefficients are stored, for example, in the register group 167.

Once the storage is completed, the sequence control circuit 182 selects pixel data of four pixels using the multiplexer 111, and outputs the selected pixel data to the orthogonal transformer 121. Accordingly, out of the coefficients obtained by the orthogonal transformer 121 performing an orthogonal transformation, two coefficients from the lowest frequency side are stored in the register group 162, and the remaining two coefficients are stored in the register group 168.

Once orthogonal transformation of the pixel data of eight pixels in total is performed two times separately as described in the above, the sequence control circuit 182 then performs eight-point orthogonal transformation using the two coefficients respectively stored in the register groups 161 and 162 by means of the orthogonal transformer 122. The two coefficients obtained in the orthogonal transformation from the lowest frequency side are stored, for example, in the register group 163. Furthermore, the following two low-frequency coefficients (i.e., the third and forth coefficients from the lowest frequency side) are stored, for example, in the register group 165.

After performing the eight-point orthogonal transformation as in the above, the sequence control circuit 182 selects pixel data of four pixels using the multiplexer 111, and performs the orthogonal transformation twice using the orthogonal transformer 121 in a similar manner. By performing the orthogonal transformation twice, the two coefficients from the lowest frequency side are stored in the respective register groups 161 and 162, and the remaining coefficients are stored in the respective register groups 169 and 170.

The second orthogonal transformation by the orthogonal transformer 122, performed after the pixel data of sixteen pixels is stored in the register group 102, is performed in that state. The orthogonal transformation is performed by using the orthogonal transformer 122. The two coefficients obtained in the orthogonal transformation from the lowest frequency side are stored, for example, in the register group 164. Furthermore, the following two low-frequency coefficients are stored, for example, in the register group 166.

The orthogonal transformer 123 performs a sixteen-point orthogonal transformation. After performing the eight-point orthogonal transformation for the second time, the sequence control circuit 182 performs the sixteen-point orthogonal transformation using the two coefficients stored in the respective register groups 163 and 164 by means of the orthogonal transformer 123. The four coefficients obtained in the orthogonal transformation from the lowest frequency side are stored in the respective registers 171-174. In FIG. 1, "DC" indicates a coefficient of a direct-current component, and "AC1-AC3" indicates a coefficient of an alternating current (AC) component. The numbers "1"-"3" attached to "AC" indicate the frequency level of the AC component.

Figure 4A:
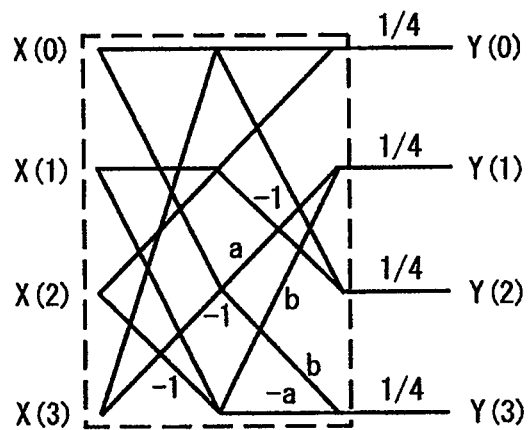
FIG. 4A is a diagram illustrating a computation performed in a four-point slant transformation.
Figure 4B:
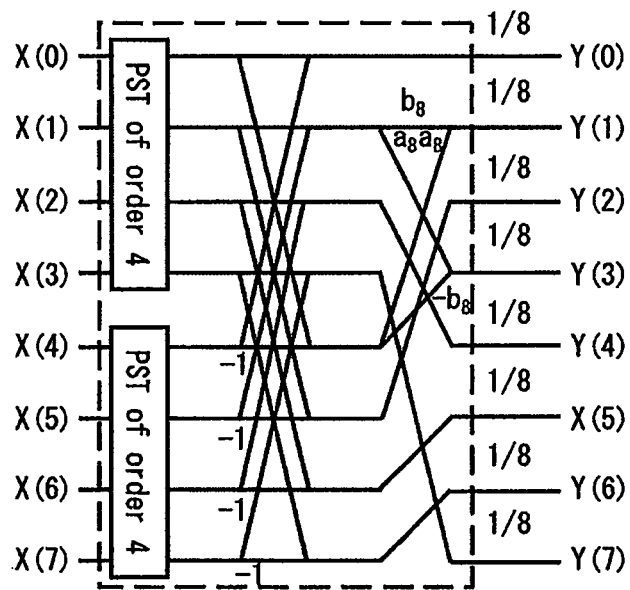
FIG. 4B is a diagram illustrating a computation performed in an eight-point slant transformation by means of a four-point slant transformation.

In the present embodiment, pixel data of one block is divided into four, and the four-point, eight-point, and sixteen-point orthogonal transformations are performed in respective first-third layers, as described above. Accordingly, the eight-point orthogonal transformation is performed one time for every two times four-point orthogonal transformation is performed, and the sixteen-point orthogonal transformation is performed one time for every two times eight-point orthogonal transformation is performed, as illustrated in FIG. 2. For this reason, the slant transformation is adopted as the orthogonal transformation. This is because, as illustrated in FIGS. 4A-4C, the slant transformation has the character wherein it is capable of determining the coefficient of a large block size from the coefficient of a small block size (Non-Patent Document 1). Another type of transformation may be adopted as long as it is the orthogonal transformation with that character.

The slant transformation is capable of performing calculation in a similar circuit configuration even with different number of points, and thus has the advantage that it can be easily implemented in the LSI.

In FIG. 2, "X(0)"-"X(31)" represent pixel data, and $Yi(j)_k$ ("i" is a layer number; "j" is a number for a transformation coefficient; and "k" is a block number) represents a coefficient. Accordingly, "$Y2(0)_1$", for example, represents the DC component obtained by performing the orthogonal transformation of the second layer with a block number of "1" (the block at which orthogonal transformation is performed for the first time). Furthermore, "¼", "⅛", and "1/16" represent multipliers. In FIGS. 4A-4C, "X(0)"-"X(31)" represent pixel data in a similar way as FIG. 2, and "Y(0)"-"Y(15)" represent coefficients. "−1", "¼", "⅛", "a", "b", "$a_8$", "$b_8$", "$a_{16}$", and "$b_{16}$" represent multipliers in a similar manner. The multiplier of "1" is omitted. The specific values for "a", "b", "$a_8$", "$b_8$", "$a_{16}$", and "$b_{16}$" are respectively "$a=3/5^{1/2}$", "$b=1/5^{1/2}$", "$a_8=4/21^{1/2}$", "$b_8=(5/21)^{1/2}$", "$a_{16}=8/85^{1/2}$", and "$b_{16}=(21/85)^{1/2}$". The basis functions of the sixteen-point slant transformation are illustrated in FIG. 3.

In the present embodiment, among the coefficients obtained by performing the eight-point slant transformation, only the four coefficients are used. For this reason, the orthogonal transformer 122 in the second layer performs the operations that are illustrated in FIG. 5 by using a total of four coefficients obtained by the two four-point orthogonal transformations, and thus calculates only four coefficients. In a similar manner, the orthogonal transformer 123 in the third layer also performs the operations that are illustrated in FIG. 6 by using a total of four coefficients obtained by the two eight-point orthogonal transformations, and thus calculates only four coefficients. In FIG. 5 and FIG. 6, the nodes of calculation with a positive transformation are illustrated as white dots, and the nodes of calculation with a reverse transformation are illustrated as black dots.

In order to normally perform the slant transformation of sixteen points, 48 respective additions and 20 respective multiplications need to be performed. However, if the calculation is performed just to obtain the necessary coefficients as illustrated in FIG. 5 and FIG. 6, only 28 respective additions and 17 respective multiplications need to be performed. Accordingly, the amount of calculation is greatly reduced. Due to the reduction, the scale of a circuit can be minimized, and thus the image compression can be performed at a high speed.

In the present embodiment, two of the lower-order coefficients from the four coefficients obtained by the four-point orthogonal transformation are used for the eight-point orthogonal transformation, and the remaining two coefficients (high-frequency components) are encoded. In the eight-point orthogonal transformation, four coefficients are calculated from the lowest frequency side, the two lower-order coefficients out of those four coefficients are used for the sixteen-point orthogonal transformation, and the remaining two coefficients (high-frequency components) are encoded. In the sixteen-point orthogonal transformation, four coefficients are calculated from the lowest frequency side, and those four coefficients are encoded. As described above, the coefficients of the low-frequency components obtained at the highest layer are encoded, and the coefficients of the high-frequency components that are obtained at each layer other than the highest layer are encoded. This is for the following reasons.

Low-frequency components are the components that represent smooth gradation change, and affect a large area of the image. Correlation among pixels can be taken in most effectively at the highest layer (i.e., the third layer herein). In order to increase the compressibility ratio, it is desirable that the block size be large. For those reasons, only the low-frequency components that are obtained at the highest layer are encoded.

On the other hand, high-frequency components express a large gradation change (edge portion), and affect only a narrow area of the image. The lower the layer is, the lower the frequency resolution and the higher the spatial resolution of the layer. For this reason, more precise spatial change can be realized by encoding the high-frequency components at the lower layers, thereby constantly achieving a high image quality.

The use of a long basis function is known for the effect of making mosquito noise more visually aggravating. In order to reduce mosquito noise, it is desirable that the high-frequency components use a short basis function, and that the low-frequency components that are directly related to the compressibility ratio use a long basis function.

In a slant transformation with a number of layers (layered slant transformation), the length of a basic function is variable depending on the frequency. For example, the high-frequency components obtained at a four-point slant transformation are encoded, and the low-frequency components obtained at a sixteen-point slant transformation are encoded. That is, an octave-band division is possible. Accordingly, the mosquito noise can be effectively reduced. Moreover, the expansion of quantization noise can be effectively reduced. For the above accounts, not only can encoding with the large block size be performed with a smaller amount of calculation but also constantly achieving high image quality can be realized by the use of layered slant transformation.

Next, FIG. 1 is described again.

The coefficient memory 103 is a memory that stores the coefficients obtained by the encoding of the immediately preceding line (decompressed coefficients) in a unit of one line. Once each coefficient is stored in the registers 171-174, the sequence control circuit 182 selects one of the coefficients using the multiplexer 112, and then outputs the coefficient stored in the selected register to the coefficient differentiator 131. The sequence control circuit 182 thereby calculates, by means of the coefficient differentiator 131, the difference value (coefficient difference value) between the coefficient input through the multiplexer 112 and the coefficient obtained by encoding the block that precedes it by one line at the same position that stored in the coefficient memory 103. The calculated coefficient difference value is output to the quantizer 141, and is quantized. Supposing that each coefficient stored in the registers 171-174 are "current coefficient", and that each coefficient stored in the coefficient memory 103 are "previous coefficient", the coefficient difference value is the value obtained by subtracting the current coefficient from the previous coefficient.

The quantized coefficient difference value ("index value", hereinafter) is output to the inverse quantizer 151 and the variable-length encoder 181. The index value that is output to the variable-length encoder 181 is variable-length encoded, and the post-encoded data is output from the variable-length encoder 181 as the compressed data. The index value that is output to the inverse quantizer 151 is inverse-quantized, and the coefficient difference value obtained by the inverse quantization is output to the coefficient adder 135. The coefficient adder 135 adds the coefficient difference value to the previous coefficient, thereby decompressing the current coefficient, and outputs the decompressed current coefficient to the coefficient memory 103. The sequence control circuit 182 stores the decompressed current coefficient, thereby retaining the coefficient obtained in the immediately preceding line in the coefficient memory 103.

As described above, in the present embodiment, the coefficients obtained in the slant transformation of the third layer are encoded by quantizing the difference value with the coefficients obtained in the block of an immediately preceding line at the same position. Accordingly, it is configured such that the amount of the compressed data is minimized.

As described in the above, once the processing of the coefficient that is stored in one register is completed, the sequence control circuit 182 selects another register by means of the multiplexer 112, and processes the selected register in the same way. Accordingly, the difference values of the coefficients that are stored in the respective registers 171-174 are computed, and those difference values are quantized and encoded.

The third and fourth coefficients from the lowest frequency side, which are obtained by the two slant transformations in the second layer, are stored in the respective register groups 165 and 166. Those coefficients are performed the computation of the difference values and the encoding by the quantization of the difference values likewise. In order to perform those processes, multiplexer 113, coefficient memory 104, coefficient differentiator 132, coefficient adder 136, quantizer 142, and inverse quantizer 152 are provided. Their function and connection relationship are basically the same as multiplexer 112, coefficient memory 103, coefficient differentiator 131, coefficient adder 135, quantizer 141, and inverse quantizer 151, thus the description in detail is omitted.

The third and fourth coefficients from the lowest frequency side, which are obtained by the four slant transformations in the first layer, are stored in the respective register groups 167-170. The sequence control circuit 182 individually selects the coefficients that are stored in those registers 167-170 by means of the multiplexer 112, and then outputs the selected coefficients to the quantizer 143, thereby quantizing the coefficients. The index values that are obtained by the quantization are output to the variable-length encoder 181, and are variable-length encoded. Accordingly, in regard to the coefficients that are obtained in the second and third layers, the present embodiment is configured such that the difference value is computed, such that the computed difference value is quantized and variable-length encoded, and such that each coefficient that are obtained in the first layer are quantized and variable-length encoded.

In FIG. 1, the present embodiment is configured such that the difference value between the coefficients obtained in the previous line are quantized/encoded in the second and third layers, and such that the coefficients are simply quantized and encoded in the first layer. As the advantageous effect of obtaining the difference value with the coefficients of the previous line is larger in higher layers, in the embodiment illustrated in FIG. 1, while balancing the effect and the scale of the circuit, the configuration of not obtaining the difference value in the lowest order of the first layer is adopted. However, the present invention is not limited to this configuration, and, for example, the difference value with the coefficients of the previous line may be quantized/encoded also in the first layer. It is effective for the improvement of the compressibility ratio to obtain the difference with the coefficients of the previous line. As to whether or not the difference with the coefficients of the previous line should be obtained in the all layers, this should be arbitrarily determined depending on the compressibility ratio, the scale of the circuit, and how the present embodiment is applied.

FIG. 9 is a diagram illustrating an exemplary hardware configuration of the computer enabling the above image compressing apparatus. The computer includes a CPU 91, a memory 92, an input device 93, an output device 94, an external storage device 95, a medium driving apparatus 96, and a network connecting device 97, and these elements are connected via a bus 98, as illustrated in FIG. 9. This configuration is only an example, and it should not be limited to this configuration.

The memory 92 in the above is a memory such as a RAM that temporarily stores the program or data stored in the external storage device 95 (or portable storage medium M) at the time of program execution or data update. The input device 93 includes, for example, an interface that is connected to input devices such as a keyboard or a mouse, or all of these respective elements. The output device 94 includes, for example, a display control device that is connected to a display device, or to all of these respective elements. The external storage device 95 is, for example, a hard disk device. The storage medium driving apparatus 96 is for accessing the portable storage medium M such as an optical disk or a magneto-optical disk.

The image compressing apparatus according to the present embodiment is realized by making the CPU 91 execute a program that has the functions necessary for the image compression (hereinafter, referred to as "compression software"). If the compression software is stored in the external storage device 95, each element illustrated in FIG. 1 is realized by the external storage device 95, CPU 91, memory 92, and bus 98. Accordingly, the image compressing apparatus may be realized by having the computer execute the compression software. The compression software may be stored in the storage medium M and distributed, or it may be configured so that the compression software can be obtained through the network connecting device 97. The same applies to the image decompressing apparatus that decompresses the compressed data.

Next, the image decompressing apparatus that decompresses the compressed data output from the image compressing apparatus will now be described in detail.

Figure 7:
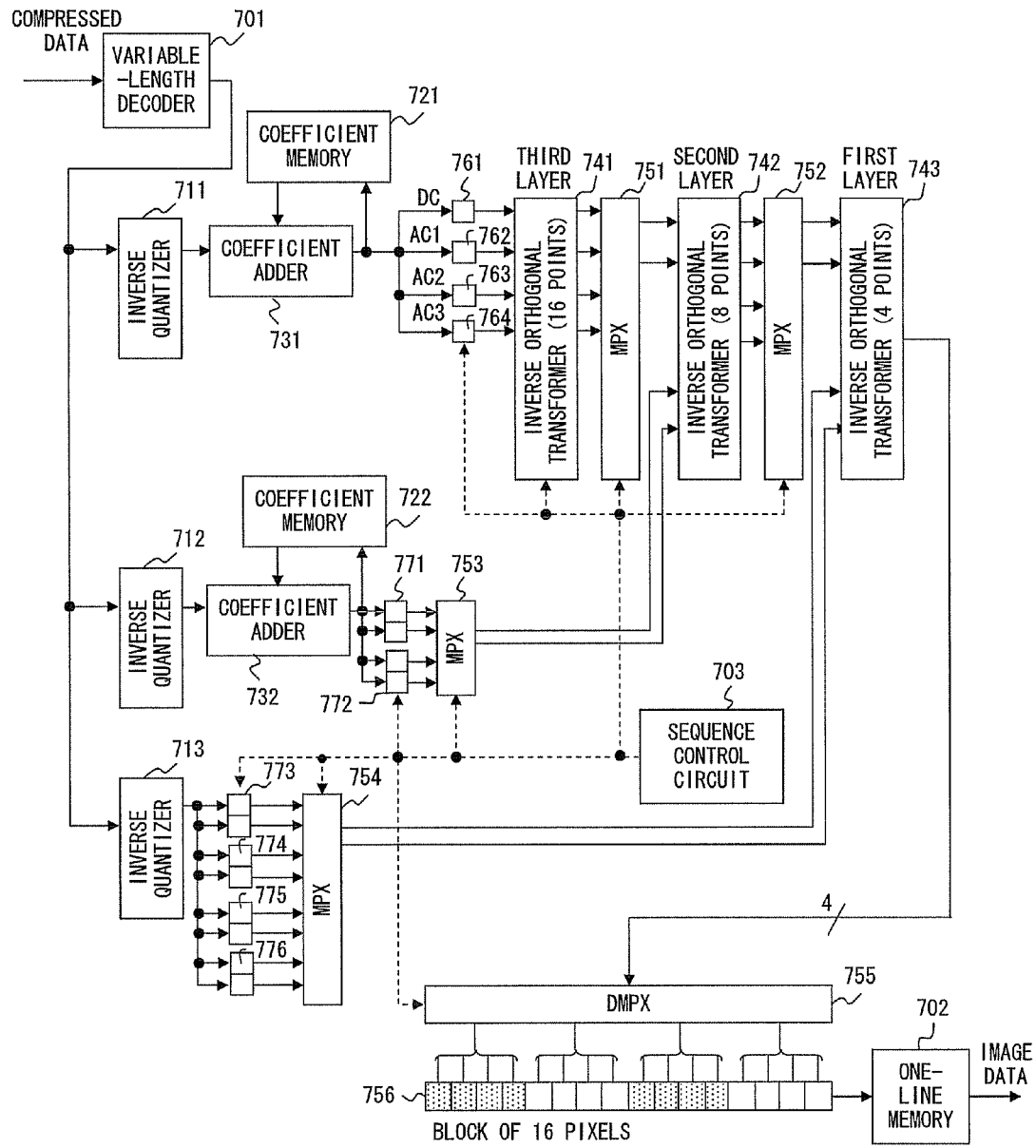
FIG. 7 is a block diagram illustrating a configuration of an image decompressing apparatus according to an embodiment of the present invention.

FIG. 7 is a block diagram illustrating a configuration of an image decompressing apparatus according to the present embodiment. The image decompressing apparatus includes a variable-length decoder 701, a one-line memory 702, a sequence control circuit 703, three inverse quantizers 711-713, two coefficient memories 721 and 722, two coefficient adders 731 and 732, three inverse orthogonal (slant) transformers 741-743, four multiplexers 751-754, one demultiplexer (DMPX) 755, four registers 761-764, and seven register groups 756 and 771-776, as illustrated in FIG. 7. The register group 756 having sixteen registers, and the register groups 771-774 with each group having two registers.

The operation of the above configuration is now described.

The variable-length decoder 701 decodes the compressed data output from the image compressing apparatus which is illustrated in FIG. 1. In regard to each coefficient that are obtained in the second and third layers, the image compressing apparatus is configured such that the difference value is computed, such that the computed difference value is quantized and variable-length encoded, and such that each coefficient that are obtained in the first layer are quantized and variable-length encoded. Accordingly, the variable-length decoder 701 performs the decoding for each layer, and outputs the decoded result to one of the inverse quantizers 711-713 according to the layer.

The result of decoding in the first layer, i.e., the index values of the coefficient that are stored in the register groups 167-170 of FIG. 1 are output to the inverse quantizer 713. The inverse quantizer 713 performs the inverse quantization for every index value, and stores the thereby obtained coefficients in the register groups 773-776. The sequence control circuit 703 selects one of the register groups 773-776 by means of the multiplexer 754, thereby outputting two coefficients to the inverse orthogonal transformer 743.

The result of decoding in the second layer, i.e., the index values of the coefficient difference value that are computed from the coefficients stored in the register groups 165 and 166 of FIG. 1, are output to the inverse quantizer 712. The inverse quantizer 712 performs the inverse quantization for every index value, and sequentially outputs the inverse quantized index value to the coefficient adder 732. In the coefficient memory 722, the encoded coefficients of the immediately preceding line are stored. The coefficient adders 732 decompress the coefficients by adding the coefficient difference value input from the inverse quantizer 712 to the coefficient stored in the memory 722 and obtained by decompressing the block that precedes it by one line at the same position. The coefficients decompressed as in the above are stored in one of the register groups 771 and 772, and are also stored in the coefficient memory 772. Accordingly, in the coefficient memory 722, the coefficients of the immediately preceding line are maintained.

The two coefficients that are stored in the respective register groups 771 and 772 are selected by the multiplexer 753 that is controlled by the sequence control circuit 703, and are output to the inverse orthogonal transformer 742.

The result of decoding in the third layer, i.e., the index values of the coefficient difference value that are computed from the coefficients stored in the registers 171-174 of FIG. 1, are output to the inverse quantizer 711. The inverse quantizer 711 performs the inverse quantization for every index value, and sequentially outputs the inverse quantized index value to the coefficient adder 731. In the coefficient memory 721, the encoded coefficients of the immediately preceding line are stored. The coefficient adders 731 decompress the coefficients by adding the coefficient difference value input from the inverse quantizer 711 to the coefficient stored in the memory 721 and obtained by decompressing the block that precedes it by one line at the same position. The coefficients decompressed as in the above are stored in one of the registers 761-764, and are also stored in the coefficient memory 721. Accordingly, in the coefficient memory 721, the coefficients of the immediately preceding line are maintained.

The inverse orthogonal transformer 741 performs a sixteen-point inverse orthogonal transformation (FIG. 6) in the third layer using the four coefficients stored in the respective registers 761-764, and outputs the total of four coefficients to the multiplexer 751. The multiplexer 751 selects the lower-order two coefficients under the control of the sequence control circuit 703, and outputs the selected coefficients to the inverse orthogonal transformer 742. The inverse orthogonal transformer 742 performs an eight-point inverse orthogonal transformation (FIG. 5) in the second layer using the two coefficients input from the respective multiplexers 751 and 753, and outputs the total of four coefficients to the multiplexer 752.

The multiplexer 752 selects the two lower-order coefficients under the control of the sequence control circuit 703, and outputs the selected coefficients to the inverse orthogonal transformer 743. The inverse orthogonal transformer 743 performs a four-point inverse orthogonal transformation in the first layer using the two coefficients input from the respective multiplexers 752 and 754, and outputs the pixel data of four pixels to the demultiplexer 755.

The demultiplexer 755 stores the pixel data of four pixels that is input from the inverse orthogonal transformer 743 in the register group 756. Every time one time of eight-point inverse orthogonal transformations is performed, the sequence control circuit 703 selects a different register group by means of the multiplexer 754, and performs the two four-point inverse orthogonal transformations. The sequence control circuit 703 thereby sequentially performs the four four-point inverse orthogonal transformations in total by means of the inverse orthogonal transformer 743. Every time this inverse orthogonal transformation is performed, the sequence control circuit 703 stores the pixel data of four pixels output from the inverse orthogonal transformer 743 in a different location of the register group 756 by means of the demultiplexer 755, thereby storing the pixel data of sixteen pixels in the register group 756. Once the decompression of one block, i.e., the decompression of the pixel data of sixteen pixels, is completed as in the above, the pixel data is output from the register group 756 to the one-line memory 702, thereby storing the pixel data in the memory 702.

The one-line memory 702 is capable of storing the image data of one line. Thus, the decompressed image data is stored in the one-line memory 702 in a unit of one line, and then is passed to a subsequent stage.

For the above described reasons, the image decompressing apparatus decompresses the image data in units of a block and a line. As illustrated in FIG. 8, the decompression in units of a block is performed by three-layer inverse orthogonal transformation in which two eight-point inverse orthogonal transformations are performed for every sixteen-point inverse orthogonal transformation, and two four-point inverse orthogonal transformation is performed for every eight-point inverse orthogonal transformation, in a similar manner as the compression.

In the present embodiment, the image compression is performed for a one-dimensional block with a number of pixels consecutive on one line, but the image compression may be performed for a two-dimensional block. Here, the layered orthogonal transformation will now be described in detail with FIGS. 10A-10E and FIG. 11, with an example in which the orthogonal transformation of an 8×8-pixel two-dimensional block is performed by the one-dimensional four-point and eight-point inverse orthogonal transformations.

FIG. 10A is a diagram illustrating the notations of each pixel in the spatial domain. In the image in which pixels are notated as illustrated in FIG. 10A, the orthogonal transformation of a 4-pixel block is firstly performed in the horizontal (scanning) direction. FIG. 10B is a diagram illustrating the coefficients obtained by performing that orthogonal transformation. In FIG. 10B, "n", "i", "j", and "k" respectively represent layer number, coefficient number, block number, and line number, in the notation of $Yn(i)_j^k$.

After the orthogonal transformation of a four-pixel block in the horizontal direction is performed, the orthogonal transformation of a four-pixel (coefficient) block in the vertical (sub-scanning) direction is performed. FIG. 10C is a diagram illustrating the coefficients obtained by performing that orthogonal transformation. In FIG. 10C, "n", "i" & "j", and "k" respectively represent layer number, coefficient number of matrix expression, and block number, in the notation of $Yn(i,j)_j^k$. As the layer number, "1" represents an 8×8-pixel block of the first layer, and "2" represents an 8×8-pixel block of the second layer.

After the orthogonal transformation of a four-pixel block in the vertical direction is performed, the order of the low-frequency components and high-frequency components are sorted by collecting the four coefficients (low-frequency components) from the lowest frequency side for every 4×4-pixel block. Due to that change of order, the arrangement of the coefficients that are illustrated in FIG. 10C is changed to that illustrated in FIG. 10D, and the four low-frequency components of a 4×4-pixel block are gathered to the 4×4-pixel block as a 2×2-pixel block. Subsequently, the orthogonal transformation of an 8×8-pixel block is realized by sequentially performing the orthogonal transformation of an eight-pixel block in the respective horizontal direction and vertical direction, in a similar manner as for the four-pixel block. FIG. 10E illustrates a state in which the above orthogonal transformation has been performed.

In the above orthogonal transformation of a two-dimensional block, the orthogonal transformation of a pixel block is performed alternately between the vertical direction and the horizontal direction, but it may be configured such that the orthogonal transformation in the vertical direction is performed after the orthogonal transformation of a four-pixel block and an eight-pixel block is successively performed. As is apparent from the above, the order of performing the orthogonal transformation is variable. FIG. 11 is a diagram illustrating the coefficients obtained by performing the orthogonal transformation of a four-pixel block and an eight-pixel block in the horizontal direction. In the notation of $Yn(i)_j^k$, "n", "i", "j", and "k" respectively represent layer number, coefficient number, block number, and line number.

In the present embodiment, the orthogonal transformation of three layers is performed. Although the above example of orthogonal transformation of a two-dimensional block is for performing the orthogonal transformation of two layers, the number of layers may be three or more. Accordingly, the orthogonal transformation of a 16×16-pixel block may be performed, for example.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiment of the present invention have been described in detail, it should be understood that the various changes, substitutions, and alterations could be made hereto without departing from the spirit and scope of the invention.

The invention claimed is:

1. An image compressing apparatus for compressing image data that has pixel data for each pixel, comprising:
    a data generation unit configured to generate a plurality of second pixel data groups by dividing a first pixel data group including a plurality of pixels existing in block that divides an image;
    a first transforming unit configured to perform an orthogonal transformation for each of the second pixel data group generated by the data generation unit, and outputting a plurality of coefficients that represent frequency components;
    a second transforming unit configured to perform an orthogonal transformation using a predetermined number of coefficients from a lowest frequency side from among the plurality of coefficients obtained by the orthogonal transformation for each piece of the second pixel data group performed by the first transforming unit; and
    an encoding unit configured to generate compressed data from coefficients outputted by the second transforming unit and coefficients not used by the second transforming unit for the orthogonal transformation from among coefficients outputted by the first transforming unit.

2. The image compressing apparatus according to claim 1, wherein
the second transforming unit changes a point of the orthogonal transformation, and performs the orthogonal transformation in two or more layers with a predetermined number of coefficients from a lowest frequency side.

3. The image compressing apparatus according to claim 1, wherein the encoding unit comprises,
a coefficient difference value calculation unit configured to calculate a coefficient difference value between a coefficient and a previously decompressed coefficient, for every coefficient eventually outputted by the second transforming unit,
a coefficient difference value quantization unit configured to quantize the coefficient difference value calculated for every coefficient by the coefficient difference value calculation unit, and configured to output a quantization value obtained by the quantization,
an inverse quantization unit configured to inverse-quantize the quantization value output for every coefficient from the coefficient difference value quantization unit, and configured to output the coefficient difference value,
a coefficient decompressing unit configured to decompress and output the coefficients via a calculation using the coefficient difference value output for every coefficient by the inverse quantization unit and the previously decompressed coefficient, and
a compressed data generation unit configured to generate the compressed data by using the quantization value outputted by the coefficient difference value quantization unit and the coefficients not used by the second transforming unit for the orthogonal transformation from among coefficients outputted by the first transforming unit.

4. The image compressing apparatus according to claim 1, wherein the second transforming unit calculates a predetermined number of coefficients from a lowest frequency side.

5. An image compressing method for compressing image data that has pixel data for each pixel, comprising:
generating a plurality of second pixel data groups by dividing a first pixel data group including a plurality of pixels existing in block that divides an image;
performing orthogonal transformations in a plurality of layers to the second pixel data group using only a predetermined number of coefficients from a lowest frequency side from among coefficients obtained by a plurality of orthogonal transformations performed in a lower layer; and
generating compressed data by encoding a predetermined number of coefficients from the lowest frequency side from among coefficients obtained in orthogonal transformation of a highest layer and coefficients not used in orthogonal transformations from among coefficients obtained in a layer other than the highest layer.

6. An image decompressing apparatus for decompressing image data that is encoded by the image compressing apparatus according to claim 1, comprising:
a first decompressing unit coefficients outputted by the second transforming unit and the coefficients not used by the second transforming unit for the orthogonal transformation from among coefficients output by the first transforming unit, from the compressed data;
a first inverse transforming unit configured to perform an inverse orthogonal transformation using the coefficients outputted by the second transforming unit decompressed by the first decompressing unit; and
a second inverse transforming unit configured to perform an inverse orthogonal transformation using a predetermined number of coefficients from a lowest frequency side from among coefficients outputted by the first inverse transforming unit, and coefficients of the first transforming unit decompressed by the first decompressing unit, and configured to decompress the second pixel data group.

7. A non-transitory computer-accessible storage medium on which is recorded a program for enabling a computer that can be used as an image compressing apparatus compressing image data having pixel data for every pixel to execute a process, the process comprising:
generating a plurality of second pixel data groups by dividing a first pixel data group including a plurality of pixels existing in block that divides an image;
performing a first orthogonal transformation for each of the second pixel data groups generated by the generating, and outputting a plurality of coefficients that represent frequency components;
performing a second orthogonal transformation using a predetermined number of coefficients from a lowest frequency side from among the plurality of coefficients obtained by the first orthogonal transformation for each piece of the second pixel data group; and
generating compressed data from coefficients output by the second orthogonal transformation and coefficients not used by the second orthogonal transformation from among the plurality of coefficients output by the first orthogonal transformation.

8. A non-transitory computer-accessible storage medium on which is recorded a program for enabling a computer that can be used as an image decompressing apparatus decompressing image data encoded by the image compressing apparatus according to claim 1 to execute a process, the process comprising:
decompressing coefficients outputted by the second transforming unit and the coefficients not used by the second transforming unit for the orthogonal transformation from among coefficients output by the first transforming unit, from the compressed data;
performing an inverse orthogonal transformation using the coefficients outputted by the decompressing; and
performing an inverse orthogonal transformation using a predetermined number of coefficients from a lowest frequency side from among coefficients output by the inverse orthogonal transformation and coefficients of decompressed the first transforming unit, and for decompressing the second pixel data group.

9. The image compressing apparatus according to claim 1, wherein the data generation unit is configured to read to first pixel data group from a one line memory.

10. The image compressing apparatus according to claim 9, wherein the data generation unit is configured to communicate over a vehicle-installed LAN with the one-line memory.

* * * * *